Nov. 19, 1963　　　S. J. KAMINSKY　　　3,111,447
MEANS FOR HEAT SEALING SYNTHETIC MATERIALS
Filed June 8, 1961　　　　　　　　　　　　　2 Sheets-Sheet 1

Inventor:
Stanley J. Kaminsky,
by Russell, Chittick & Pfund
Attorneys

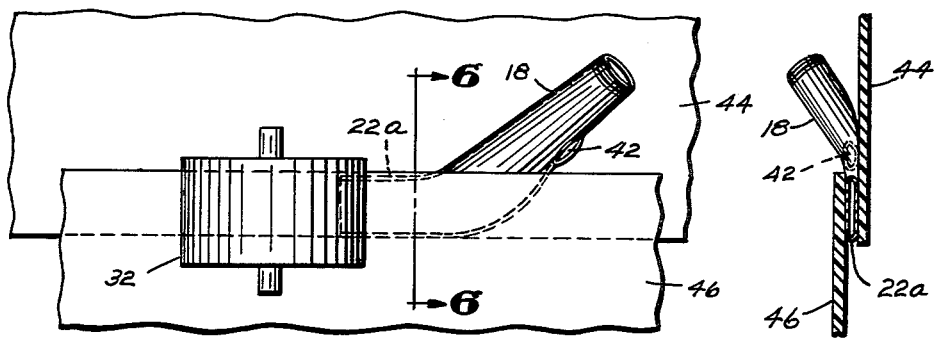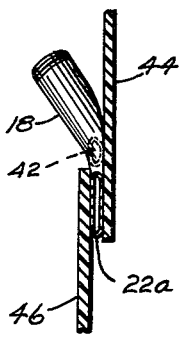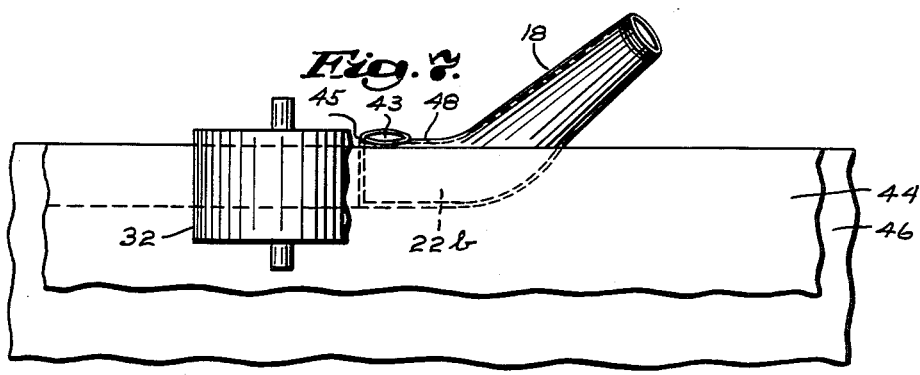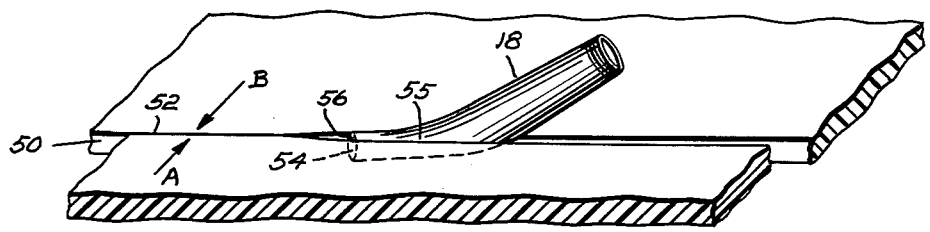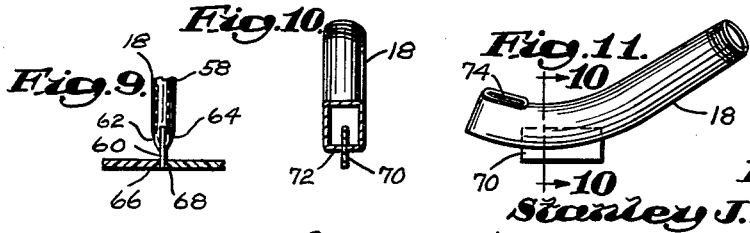

United States Patent Office 3,111,447
Patented Nov. 19, 1963

3,111,447
MEANS FOR HEAT SEALING SYNTHETIC MATERIALS
Stanley J. Kaminsky, 619 Neponset St., Norwood, Mass.
Filed June 8, 1961, Ser. No. 125,631
4 Claims. (Cl. 156—497)

This invention relates generally to the heat sealing of synthetic materials and specifically to a means and a method for cohesively bonding thermoplastic substances.

There are various means of bonding synthetic materials to each other, all of which depend upon the provision of a heating element to activate the materials prior to the application of pressure. Maintaining the heating element at the optimum temperature for effective bonding is an extremely critical factor in this type of operation, as excessive temperatures will result in charring of the materials, and the lack of proper heat will produce an ineffective bond. Apparatus generally in use utilize an electrical resistant type of radiant heating blade which is subject to temperature differentials varying directly with respect to the thickness of the material and the length of time in contact therewith. In effect, the material, which may be fed at varying rates by hand or machine, will develop a varying type of heat dissipation factor.

Therefore, it is the primary object of the present invention to provide a method for applying a high temperature gas, generally air, from an external source to the synthetic material to activate the material prior to the external application of pressure.

A further object of this invention is to provide a tool which may be maintained at a constant thermal temperature due to a convectional type heat transfer.

A still further object of this invention is to provide a tool for insertion between layers of a synthetic material adapted to direct the flow of convectional heat therebetween.

Another object of this invention is to provide a tool which may indirectly apply a stream of hot temperature gases against the surfaces of the synthetic material to activate same prior to application of pressure thereon.

Another object of this invention is to provide a radiant type heating tool which may be maintained at a constant temperature due to the uniform flow of high temperature gases therethrough in sufficient volume.

Other objects of the invention will, in part, be obvious and will, in part, appear hereinafter.

In the drawings:

FIG. 5 is a top plan view of an application utilizing a modified form of the tool;

FIG. 6 is a view taken on line 6—6 of FIG. 5;

FIG. 7 is a view of another modified form of the tool member;

FIG. 8 is a view illustrating the uses of the tool in the heat sealing of the abutting edges of co-planar positioned sheets of synthetic material; and FIGS. 9, 10 and 11 are views of various types of blade mechanisms positioned within a tool member embodying the features of this invention.

Figure 1:
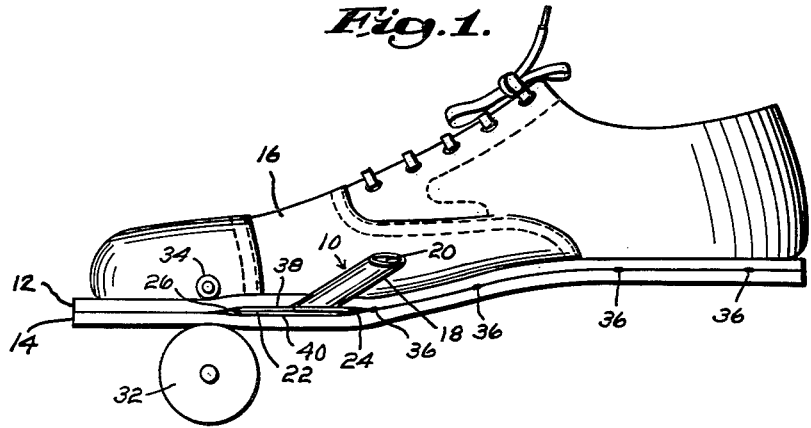
FIG. 1 illustrates a view in plan of a typical application showing a tool in position between superimposed layers of synthetic material.
Figure 2:
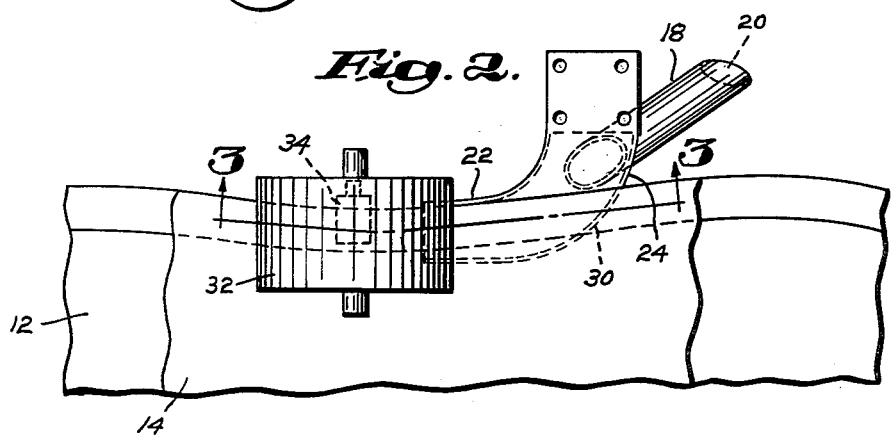
FIG. 2 is a side elevation view of the tool and application shown in FIG. 1.

Referring to the drawings, there is illustrated a tool member 10 which, as is shown in FIG. 1, is positioned between superimposed layers of plastic materials 12 and 14 of a shoe 16 wherein the superimposed layers of plastic material are in the process of being bonded to each other. The tool means 10 comprises a conducting tube 18 of any suitable configuration having a passageway 20 therethrough adapted for connection to a duct or the like which in turn conveys high temperature gases from an external generator (not shown) to the tool portion itself. Various means for the generation of gases having a high thermal content are well known to the industry, and it is not deemed necessary to disclose the sources of the present application as they do not form any part of the present invention. The lower portion of the conducting tube 18 is formed into a flat nozzle 22 having a leading edge 24 and a trailing edge 26. The nozzle 22 is closed on all sides except the trailing edge, which includes an orifice 28.

Figure 3:
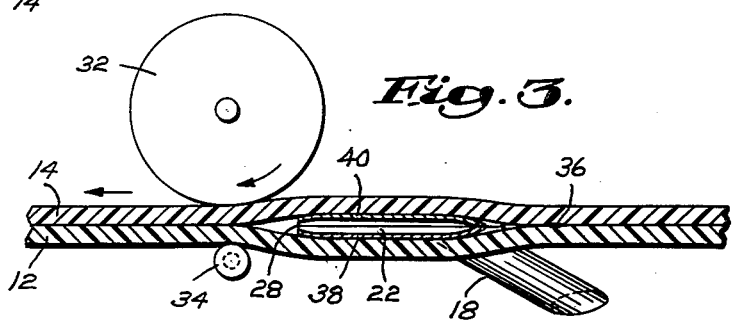
FIG. 3 is a view taken on line 3—3 of FIG. 2.
Figure 4:
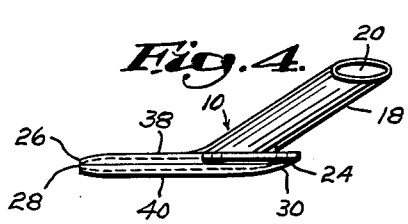
FIG. 4 is a view in plan of the tool.

It will be apparent to those skilled in the art that the nozzle 22 is relatively thin and acts as a blade with respect to the conducting tube 18 so as to permit its easy insertion between the pliable layers of synthetic materials. Furthermore, the leading edge 24 has a radius 30 formed thereon to facilitate longitudinal passage of the nozzle between superposed layers of material. The nozzle 22, which is adapted to direct the flow of hot gases from the external source to a position between the layers of the synthetic material, is located between layers 12 and 14 as illustrated in FIG. 1 in advance of the contact area where external pressure is applied to the layers by means of rolls 32 and 34. It will be seen by referring to FIG. 1 that the layers of synthetic material 12 and 14 may be spot tacked together at spaced intervals 36 to hold them in position prior to the bonding operation. It will also be seen by referring to FIG. 3 that, as the engaging materials 12 and 14 progress in the direction of the arrow, the hot gases are directed by the conducting tube 18 into the nozzle portion 22 and out through the orifice 28. In so doing, the nozzle walls, being thin, are heated to the gas temperature. The walls 38 and 40 in turn heat the areas of the material which they engage as the material moves therepast to soften these materials and activate their thermo-plastic quality prior to the application of pressure by the rolls 32 and 34.

It will be understood by those skilled in the art that, as the flow of gas through the nozzle 22 is of a constant nature, temperature and adequate volume, there will be very little variance in the temperature applied or conveyed to the surfaces of the material by the sides of the blade or blast of air flowing from the orifice 28. Thus the blade sides are able to cause a pre-heating effect, with final heating to sealing temperature applied by the blast from the orifice 28.

In FIG. 5 there is illustrated a modified form of this invention in which the conducting tube 18 has an additional orifice 42 positioned at the leading edge of the nozzle which will direct a stream of hot gas between the overlapping areas of the synthetic materials 44 and 46 so as to pre-heat them prior to time of the sequential operation to the application of the blast of hot air or gas from the rear end nozzle 22a. This form of the invention may be desirable where the materials to be bonded required more heat, and it is deemed necessary to additionally soften the thermo-plastic prior to the final bonding process. The use of the tool shown in FIG. 5 facilitates the bonding of overlapping edges of large sheets of material.

FIG. 7 illustrates a further modification of this invention where the nozzle portion or blade 22b comprises an entirely closed member and wherein a discharge port 43 is formed on the upper lateral surface 48 adjacent the rear end 45 so as to exhaust the stream of hot gas in a direction away from the superimposed layers of materials. This form of the invention enables the constant flow of hot gas through the conducting tube 18 and the nozzle portion or blade 22b to maintain the walls thereof at a constant temperature. The nozzle portion or blade 22b in this instance will, by direct engagement with the surfaces of the synthetic materials, heat them to the bonding temperature.

In FIG. 8 there is shown a further modified form of this invention used where it is desired to heat seal the abutting edges 50 and 52 of synthetic materials placed in a co-planar position. In this form of the invention, the conducting tube 18 has its remote end 54 converging to form a blade of sorts 55 with an end 56. It will be seen that as the nozzle is located just in advance of forces acting to exert lateral pressure in the direction of arrows A and B on the co-planar positioned sheets of synthetic material, the edges 50 and 52 will be activated by the high temperature gas directed thereagainst allowing the pressure to complete the fusing process.

In the basic forms of the invention heretofore shown and described, the conducting tube 18 and the nozzle portions or blades 22, 22a, 22b and 55 have been set forth as a one-piece integral structure. It should be understood that various other forms of blade elements can be devised which may be permanently or detachably secured to the connecting tube 18 for any form of a specific application desired.

In FIG. 9 there is illustrated a variation of the distal end 58 of the conducting tube 18 wherein a blade element 60 in the form of a strip of heat conducting material is crimped or otherwise secured between the side portions 62 and 64 of the distal end 58 so as to position the blade centrally therein. The flow of gas is directed downwardly against the portion of the blade 60 which is retained between the side walls 62 and 64. This will subsequently transfer the heat externally of the tube by conduction to the portion of the blade 60 outside thereof in such a manner that as the blade passes between edges 66 and 68 of the sheets of synthetic material it will be softened prior to the application of lateral pressure to produce the final bonding.

FIGS. 10 and 11 illustrate a further modified form of this invention where a blade member 70 is positioned within the lower lateral wall 72 of the connecting tube 18 so that the upper part of blade 70 will lie in the path of the flow of gases which in normal travel escape upwardly away from the material passing through the discharge port 74. In this embodiment of the invention, the blade element 70 will be heated by the hot gases flowing through the conducting tube 18 and subsequently the heat will travel to the external portion of the blade. By drawing the lateral surfaces of the blade along the edges of the material, sufficient heating of the material will take place to activate the thermo-plastic qualities, and application of pressure thereto will effectuate a cohesive bond.

Since other obvious modifications may be made in the device without departing from the scope of the invention, it is intended that all matter contained herein be interpreted in an illustrative and not in a limiting sense.

I claim:

1. A tool for use in cohesively bonding thermo-plastic materials, said tool comprising a thin walled flattened tube, the said walls being substantially parallel and of substantially uniform thickness over most of their effective heat transferring area, said walls adapted to be placed between facing surfaces of said materials, the walls of said tube tapering together at the edges to form a thin leading edge lying in the plane of the flattened tube to facilitate progressive separation of said materials as the tube, when in operative position, is moved parallel to said materials, one wall of said tube having in series therewith a tubular lateral extension beyond the flattened wall, means for connecting a source of hot air to said tubular extension, an opening in said tube remote from said hot air connecting means and oppositely disposed to said thin leading edge, whereby said hot air may pass through said tube when said flattened tube is in operating position to heat the walls of said tube and to transmit heat to both opposed material surfaces.

2. A tool for use in cohesively bonding thermo-plastic materials, said tool comprising a thin walled flattened tube, the said walls being substantially parallel and of substantially uniform thickness, said walls adapted to be placed between facing surfaces of said materials, the walls of said tube tapering together at the edges to form a thin leading edge lying in the plane of the flattened tube to facilitate progressive separation of said materials as the tube, when in operative position, is moved parallel to said materials, one wall of said tube having in series therewith a tubular lateral extension beyond the flattened wall, means for connecting a source of hot air to said tubular extension, the trailing end of said tube remote from said thin leading edge being open whereby said hot air may pass through said tube when said flattened tube is in operating position to heat the walls of said tube and to transmit heat to both opposed material surfaces and whereby the hot air escaping from said trailing end will be directed against and supply additional heat to the opposed surfaces as they move away from the open end of said tube to put the surfaces in condition to be pressed together for permanent bonding.

3. A tool for use in cohesively bonding thermo-plastic materials, said tool comprising a thin walled flattened tube with parallel walls tapering together at the edges to provide a thin leading edge, said walls adapted to be placed between facing surfaces of said materials, the said thin leading edge acting to facilitate progressive separation of said materials as the tube, when in operative position, is moved relative to said materials, one of the walls of said tube having in series therewith a tubular lateral extension, means for connecting a source of hot air to said tubular extension, the trailing end of said tube for substantially its full width being open whereby said hot air may pass through said tube when said parallel walls are in operating position to heat the walls of said tube and to transmit heat to both opposed material surfaces and whereby the hot air escaping from said trailing end will be directed against and supply additional heat to the opposed surfaces as they move away from the open end of said tube to put the surfaces in condition to be pressed together for permanent bonding, and another opening through said tubular extension located adjacent said leading edge of said flattened tube and in the plane thereof whereby some of said hot air passing through said tube will be directed at the opposed material surfaces prior to the arrival of said heated tool at said surfaces.

4. A tool for use in cohesively bonding thermo-plastic materials, said tool comprising a thin walled tube, said tube having a curved leading edge in the plane of the wide axis of the tube, said tube having a tubular lateral extension, means for connecting a source of hot air to said tubular extension, an opening in said tube remote from said hot air connecting means, blade means positioned intermediate the ends of said tube having one portion thereof lying without said tube and another portion lying within said tube, whereby said hot air may pass through said tube when said tube is in operating position to heat the walls of said tube and said blade.

(References on following page)

References Cited in the file of this patent

UNITED STATES PATENTS

| | | |
|---|---|---|
| Re. 20,488 | Zinkil | Aug. 24, 1937 |
| Re. 24,801 | Kaminsky | Mar. 22, 1960 |
| 721,746 | Robinson | Mar. 3, 1903 |
| 1,468,541 | Nagues | Sept. 18, 1923 |
| 1,809,999 | Wier | June 16, 1931 |
| 2,084,625 | Stebbins et al. | June 22, 1937 |
| 2,130,629 | Clayton | Sept. 20, 1938 |
| 2,220,545 | Reinhard | Nov. 5, 1940 |
| 2,367,725 | Lindh | Jan. 23, 1945 |
| 2,407,495 | High et al. | Sept. 10, 1946 |
| 2,587,422 | Wills | Feb. 26, 1952 |
| 2,814,471 | Carr et al. | Nov. 26, 1957 |

FOREIGN PATENTS

| | | |
|---|---|---|
| 1,231,919 | France | Apr. 19, 1960 |